US011614725B1

(12) United States Patent
Jarrett, Jr.

(10) Patent No.: US 11,614,725 B1
(45) Date of Patent: Mar. 28, 2023

(54) REMOTE ANNUNCIATOR

(71) Applicant: OmniMetrix, LLC, Buford, GA (US)

(72) Inventor: Harold M Jarrett, Jr., Jefferson, GA (US)

(73) Assignee: OmniMetrix, LLC, Buford, GA (US)

( * ) Notice: Subject to any disclaimer, the term of this patent is extended or adjusted under 35 U.S.C. 154(b) by 485 days.

(21) Appl. No.: 16/744,013

(22) Filed: Jan. 15, 2020

(51) Int. Cl.
| | |
|---|---|
| G05B 19/042 | (2006.01) |
| G08C 17/02 | (2006.01) |
| H04B 1/69 | (2011.01) |
| H04L 67/02 | (2022.01) |

(52) U.S. Cl.
CPC ......... G05B 19/0425 (2013.01); G08C 17/02 (2013.01); *G05B 2219/23297* (2013.01); *H04B 1/69* (2013.01); *H04L 67/02* (2013.01)

(58) Field of Classification Search
CPC ............ G05B 19/0425; G05B 19/0428; G05B 2219/23297; G08C 17/02; H04B 1/69; H04L 67/02; H04W 4/00; H04W 4/02; H04W 4/021; G07C 5/008
See application file for complete search history.

(56) References Cited

U.S. PATENT DOCUMENTS

| | | | |
|---|---|---|---|
| 8,224,499 B1 | 7/2012 | Jarrett, Jr. | |
| 2003/0093187 A1* | 5/2003 | Walker | B64D 45/0059 |
| | | | 701/1 |
| 2005/0187677 A1* | 8/2005 | Walker | B64C 13/20 |
| | | | 701/16 |
| 2013/0053026 A1* | 2/2013 | Culpepper | H04W 4/02 |
| | | | 455/426.1 |
| 2013/0217383 A1* | 8/2013 | Culpepper | G06Q 30/0283 |
| | | | 455/426.1 |
| 2016/0302039 A1* | 10/2016 | Culpepper | H04W 4/025 |
| 2018/0160266 A1* | 6/2018 | Burch | G05F 1/66 |
| 2019/0222957 A1* | 7/2019 | Burch | B25H 3/02 |
| 2020/0162863 A1* | 5/2020 | Wurman | G01M 5/00 |

* cited by examiner

*Primary Examiner* — Orlando Bousono
(74) *Attorney, Agent, or Firm* — Kenneth W. Float

(57) ABSTRACT

Apparatus and methods for reporting data and remotely monitoring and controlling a stationary mechanical or electrical device having a device controller. The apparatus and methods employ a remote annunciator comprising a communication interface for communicating with the device controller, a computer processor for polling the device controller to monitor operational data, conditions, and alarms reported by the device controller, a graphical display for displaying visual indicators indicative of the operational data, conditions, and alarms, a cellular or satellite radio for communicating the operational data, conditions, and alarms to a remotely-located monitoring and control system comprising a web-accessible database and a compatible cellular or satellite radio. The device controller is polled via the monitoring and control system and/or remote annunciator to monitor device parameters and status, and remotely control the device.

22 Claims, 5 Drawing Sheets

REMOTE ANNUNCIATOR

BACKGROUND

The present invention relates generally to monitoring and control of remotely-located equipment or machines having equipment/machine controllers, and related methods, and more particularly, to remote annunciators and related methods for remotely monitoring and controlling equipment or machines using Ethernet or cellular/satellite Internet backhaul connectivity.

Typical equipment or machines having equipment/machine controllers for which the present invention is particularly well-suited include power generation systems using reciprocating internal combustion engines/motors, or electric power motors, and engine/motor controllers. Fire pumps, for example, may use reciprocating internal combustion engines/motors or electric power motors. Air compressors, for example, principally use electric power motors. HVAC systems, for example, essentially use electric power motors.

In all cases, there are performance values and alarm conditions that are indicators of the operation of and the health of the remote equipment or machine. In the case of generators, such conditions may include starting battery voltage, fuel level, engine speed, engine temperature, oil pressure, delivered power, volts, and amps, for example. In the case of an air compressor, parameters including motor speed, pressures, temperatures, flows, energy consumption, and operating time, are typical conditions. Fire pumps may have a combination of motor parameters and pump pressures and flows, for example. HVAC systems have parameters including temperatures, pressures, flows, run time, and the like.

It would be desirable to have remote annunciators and related systems, apparatus, and methods that extract information from the remote equipment or machine including the above and other parameters, performance values, and alarm conditions, display this information locally, relay the information to a remote data management system that stores the data, displays the data to users via the world wide web, provides for remote control of the remote equipment or machine, shares the data via an application programming interface (API) to selected users, and sends the data and alarm messages to subscribed users, for example.

Given that the application of the internet connected remote annunciator includes critical equipment such as emergency generators, air compression systems, fire pumps, and the like, then it would also be desirable for the data transport processes to have redundant routes for redundancy. For example, in the case of a wide spread power outage, a customer may lose internet connection due to situations beyond his control, even when the generator is working. In such case, having the ability to route data via cellular channels adds value to the design. Likewise, in worst case situations where cellular connectivity is also lost, the satellite transport channel offers important redundancy. Throughout this document, the multiple data routes should not be viewed as options or product permutations, but as important redundant channels for important mission critical data.

By way of example, many businesses have backup or standby power generation systems to back up power for the businesses in the event of power blackout conditions. Such standby power generation systems comprise a power generator, comprising a stationary engine that is coupled to an engine controller, which together are commonly referred to as a GENSET. The GENSET is often interfaced to a remote annunciator. Many buildings are required to have pumps to be able to drive adequate water flow to upper building floors for fire prevention purposes. Many of these pumps use diesel engines, and they, too, are often interfaced to remote annunciators. Also, engine-driven compressors are routinely used that require remote monitoring and/or control, which may be implemented using remote annunciators.

An engine controller may be hard wired to a conventional remote annunciator, which is used to alert a user of the operational condition of the GENSET, or to the fact that a problem has occurred with the operation of the power generator or engine controller. The engine controller outputs alarm signals to the conventional remote annunciator, which activates an indicator on a display panel and sounds an alert horn, for example. The conventional remote annunciator is, in essence, a dumb display, which only responds to the alarm signals to provide user alerts.

Some engine manufacturers have provided network connections to their engine controllers, allowing access to engine data. Such equipment requires an external computer with dedicated data acquisition software connected to the engine controller. While this is reasonable for diagnostic use, it is not appropriate for accessing large numbers of remote GENSETs scattered around a state, country or the world. It is relatively easy to make such a connection if the computer can be placed on the same subnet as the engine controller, but becomes more complicated otherwise. It becomes extremely difficult to make the connection from a computer to the GENSET if the computer is Internet-connected, outside of the firewall protection of the customer LAN. In fact, firewall devices are designed to prevent the very connections that this type of equipment requires.

U.S. Pat. No. 8,224,499, assigned to the assignee of the present invention, discloses remote annunciators and related methods for monitoring engine controllers that improve upon previously-existing implementations. This patent addresses the use of Ethernet Internet connectivity to communicate between the remote annunciator, a router, remote user computers, and a remotely located data management system having a database. It is stated one time in the specification that "Internet connectivity may also be implemented using a cellular Internet connection or a satellite Internet connection, in lieu of the Ethernet connection." This possible connectivity is generally shown in FIG. 1, but cellular and satellite interfaces are only shown connected to the remote annunciator. No cellular or satellite interfaces are depicted in FIG. 1 that are associated with the data management system or remote user computers and thus there is no disclosure or suggestion of implementation details regarding cellular or satellite communication between GENSETs, engine controllers, pumps, compressors, or other monitored devices and a remotely-located data management system to provide for data backhaul communication. No details of possible cellular or satellite implementations effecting communication between GENSETs, engine controllers, pumps, compressors, or other monitored devices and a remotely-located data management system to provide for data backhaul communication are disclosed or suggested in other drawing figures or in the specification. The contents of U.S. Pat. No. 8,224,499 are incorporated herein by reference in its entirety.

The annunciator disclosed in U.S. Pat. No. 8,224,499 employs discrete LEDs to display information and alarms to a user viewing its front panel. Nothing is disclosed or suggested in this patent indicating that the annunciator could, or should, extract or communicate performance data from the GENSET or engine and communicate or transfer this performance data by way of a cellular/satellite backhaul channel to a remote database. Nothing is disclosed or suggested in this patent regarding use of a cellular/satellite backhaul channel to remotely control monitored equipment/machines. Traditional annunciators only provide alarm conditions (Booleans, i.e., binary, true/false), including conditions such as Running, Low Fuel, or Low Oil Pressure, for example. It would be desirable to extract traditional Boolean alarm conditions, along with engine data such as RPM, Oil Pressure, Coolant Temperature, Volts, and Amps, and the like.

It would be desirable to have remote annunciators and related systems, apparatus, and methods having improved display capabilities that can (1) monitor/extract operational data of remote equipment or machines to which the remote annunciators are connected, including internal combustion engines/motors or electric power motors, internal combustion or electric power engine/motor controllers, pumps, compressors, and HVAC systems, and the like, and (2) communicate or transfer the monitored equipment/machine operational and alarm data and commands by way of a cellular/satellite backhaul channel between a remote annunciator, a remote data management system, and computers of users of such monitored equipment/machines. It would also be desirable to have remote annunciators and related methods that primarily use cellular or satellite communication to communicate between equipment/machines or their controllers, or pumps, compressors, HVAC systems, or other monitored equipment/machines and a remotely-located data management system to provide for data backhaul communication, and that secondarily allow cellular or satellite communication between remote user computers, the remotely-located data management system, and the remote annunciators.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
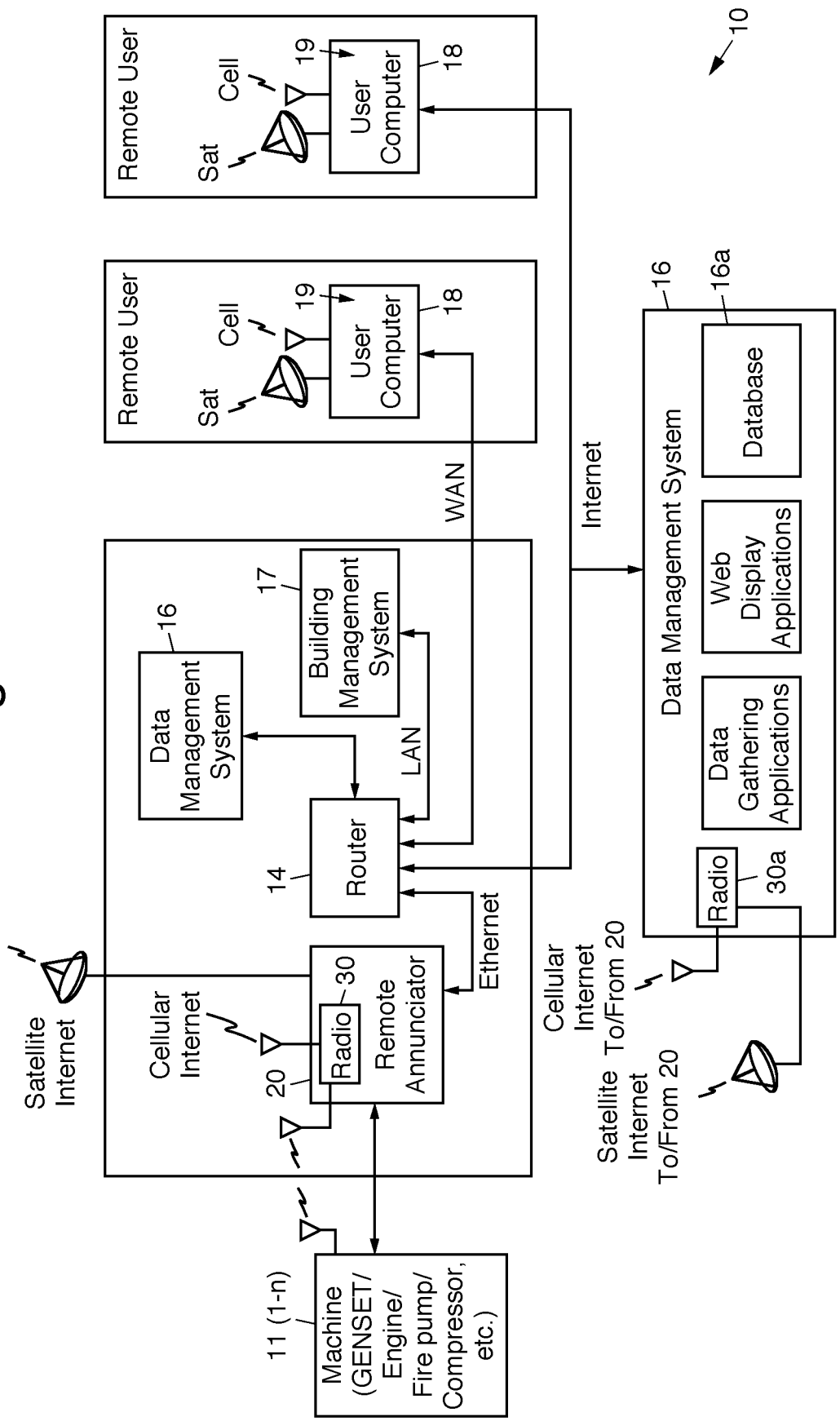
FIG. 1 illustrates an exemplary machine or equipment coupled by way of a remote annunciator to a remote data management system using cellular/satellite backhaul communication in accordance with the principles of the present invention.

By way of introduction, and referring to the drawing figures, the present invention is described below with reference to its use with an exemplary power generating system 10 (including a GENSET 11), generally referred to as equipment 11 or a machine 11. However, it is to be understood that the present invention may be adapted for use with any equipment 11 or machine 11 using an equipment/machine controller. Such equipment/machines include, for example, (1) power generation systems using reciprocating internal combustion engines/motors, or electric power motors, (2) fire pumps using reciprocating internal combustion engines/motors or electric power motors, (3) air compressors that primarily use electric power motors, and (4) HVAC systems that typically use electric power motors.

As was mentioned above, the performance values or data and alarm conditions are indicators of the operation of and the health of the remote equipment 11 or machine 11 and are accessed and processed by a remote annunciator 20. The equipment/machine data may be acquired (1) from simple digital inputs, sensing the state or status relays on the equipment 11 (used in older or inexpensive equipment), (2) from direct analog sensing, such as temperatures, pressures, voltages, and the like, or (3) from serial data interfaces, such as Modbus, CANbus, BACnet, and the like.

Figure 2:
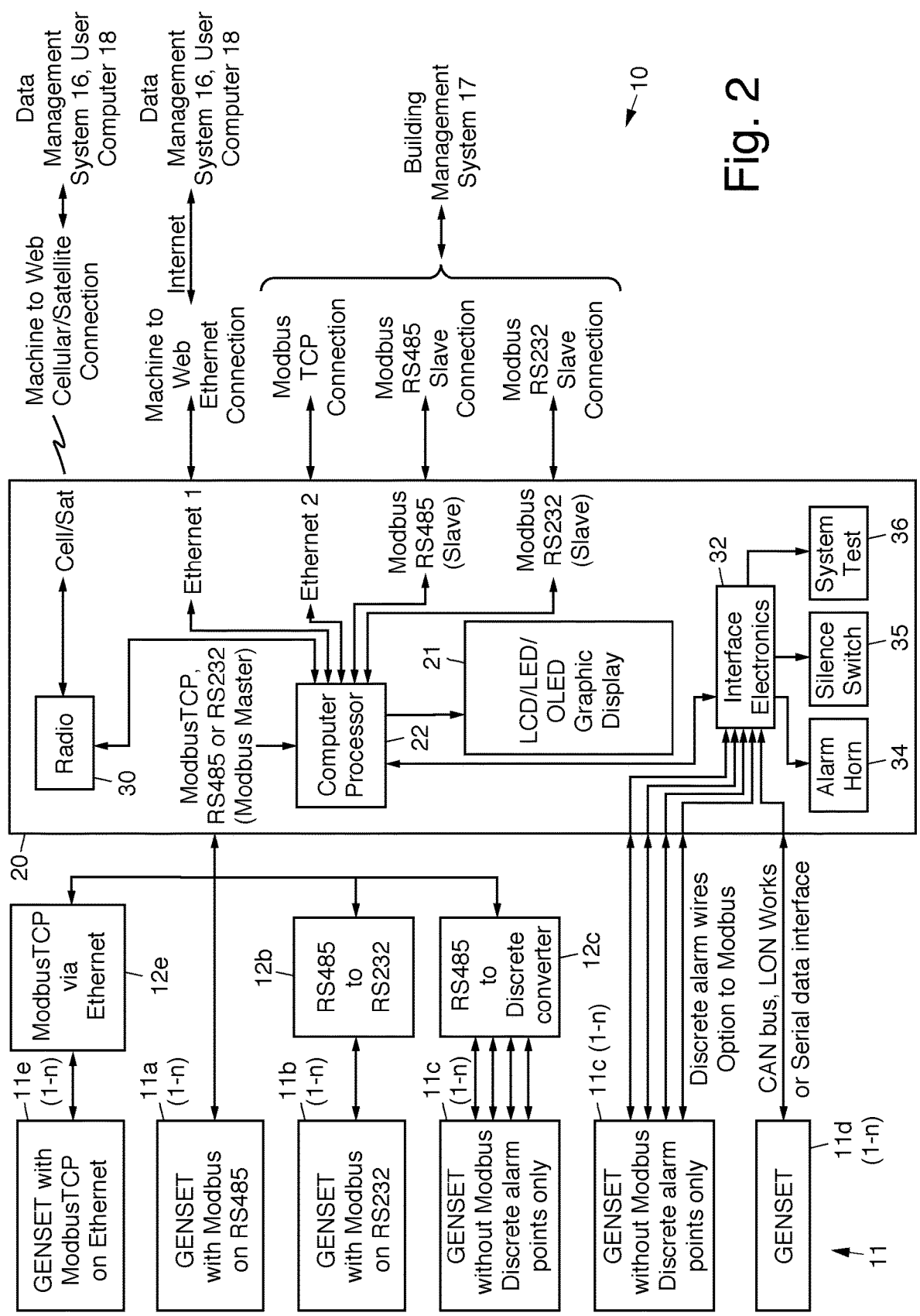
FIG. 2 illustrates details of the exemplary machine/equipment and remote annunciator shown in FIG. 1.
Figure 3:
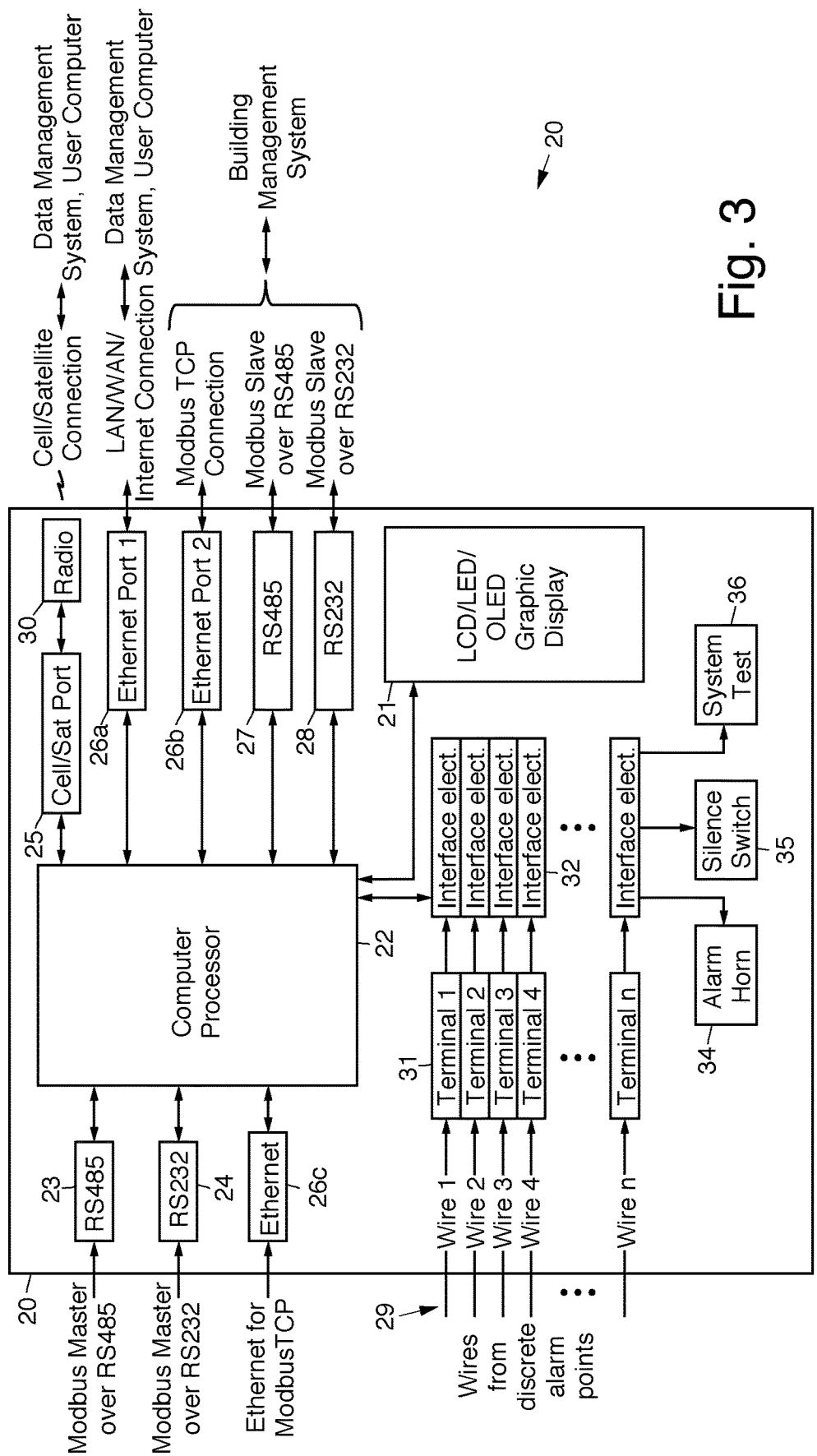
FIG. 3 illustrates details of the remote annunciator shown in FIG. 2.

As is depicted in FIGS. 2 and 3, for example, which will be discussed in greater detail later in this description, data transport of the performance values and alarm conditions may be executed over wired connections using (1) an RS485 2-wire serial data interface, (2) an RS232 3-wire serial data interface, (3) an RS422 4-wire serial data interface, (4) a CANbus 2-wire serial data interface, (5) a BACnet over RS-485 interface, (6) a BACnet over Ethernet interface, (7) a ModbusRTU over RS-485 interface, (8) a ModbusTCP over Ethernet interface, (9) or using a proprietary serial protocol, for example. It is also possible to transport that data wirelessly over connections including (1) spread spectrum radio frequency links (FIG. 4), including 900 MHz, for example, (2) WiFi bridges, (3) Bluetooth, or (4) a proprietary wireless solution. Some of the data transport interfaces/protocols are discussed in detail in the exemplary power generating system discussed below. It is also possible to transport the data over power lines, locally, using Power Line Carrier Current technology, which offers end device interfaces for all the above except for the CANbus interface. However, it is to be understood that all of the above-mentioned data transport interfaces/protocols may be employed depending upon the type of equipment/machine 11 and nature of the installation.

In some cases, the annunciator 20 must be wired to the equipment/machine 11 to meet government regulations. Life Safety Regulation NFPA110, for example, requires that the annunciator be hard wired to a generator system and be powered by a generator battery. For applications where life safety is not involved, there may be benefits in executing the equipment-to-annunciator link via a wireless link, mentioned above.

A primary focus of the present invention relates to the connectivity between the annunciator 20 and a data management system 16 (backhaul) that accumulates the data and executes various data processes. The backhaul may be implemented using Ethernet, Cellular, and/or Satellite transport methods. It some instances, the data management system 16 is hosted local to the equipment/machine site with the annunciator 20, but more likely, and generally, the data management system 16 is remote from the equipment/machine and annunciator site.

Referring to FIG. 1, it illustrates an exemplary power generating system 10 employing a remote annunciator 20 and remotely-located data management system 16 in accordance with the principles of the present invention. The remote annunciator 20 is used to interface with one or more remotely-located stationary power generators with engine controllers, referred to as GENSETs 11, or more generically equipment 11 or machines 11. Multiple machines 11 are indicated by the "(1–n)" designation. The multiple machines 11 are simultaneously accessible from the remote annunciator 20. The stationary machine 11 may be an engine 11, such as may be employed in a pump system having an engine controller. Also, the machine 11 may be employed in a compressor system having an engine controller. The terms "remote" and "remotely-located" are used to mean that the annunciator 20 and machine 11 are remotely located from the data management system 16, and also from an owner, operator, or user of the machine 11, and that the annunciator 20 is remotely located from the machine 11. This detailed description focuses on the use of the remote annunciator 20 and data management system 16 in conjunction with a machine 11, but it is to be understood that the principles of the present invention are readily applied to other machines 11, such as pump systems, compressor systems, or other systems or devices employing an engine 11 and/or engine controller. Thus, the machine 11, pump system, compressor system, or other system or device, may generally be referred to as a machine 11, and this term is used in this specification and in certain of the drawing figures.

The machine 11 is coupled to the remote annunciator 20 via one of several connection techniques which are illustrated in some detail in FIGS. 2 and 3. The connection techniques are implemented using discrete wiring 29 (FIG. 3), a Modbus over RS232 port 24 or interface 24 (FIG. 3), a Modbus over RS485 port 23 or interface 23 (FIG. 3), a ModbusTCP connection (FIGS. 2-4), or using other serial data transport protocols, such as a controller area network (CAN) bus or local operating network (LONWorks) bus. The machine 11 to remote annunciator 20 connection may also be made through a wireless link, such as a secure spread spectrum data link (shown and discussed with reference to FIG. 4).

As is shown in FIG. 1, the remote annunciator 20 is coupled by way of an Ethernet connection to a router 14. The router 14 may be coupled to a local data management system 16'. The router 14 may be coupled by way of a local area network (LAN) to a building management system 17. The building management system 17 allows a user to monitor and control the machine 11. The router 14 may be coupled by way of a wide area network (WAN) to one or more remotely-located user computers 18. The router 14 may be coupled by way of the Ethernet Internet connection to one or more remotely-located user computers 18. The router 14 is coupled by way of the Ethernet Internet connection to a remotely-located data management system 16. In accordance with the principles of the present invention, Internet connectivity between the remote annunciator 20 and the remotely-located data management system 16, known as a backhaul channel, is implemented using a cellular or satellite Internet connection (radios 30, 30a), which is preferably cellular. The secondary (or satellite) Internet backhaul channel uses Ethernet connectivity and is used as a secondary backhaul connection to the remotely-located data management system 16. In addition, the cellular/satellite backhaul channel may also be used as a communication channel to transmit commands input by a user connected to the remotely-located data management system 16 to the remote annunciator 20 that are executed to remotely poll and control operation of the machine 11. Thus, the preferred implementation of the remote annunciator 20 uses cellular backhaul connectivity, but also supports Ethernet and satellite connectivity, depending upon customer/user needs.

The remote annunciator 20 is designed to deliver operational data that it receives (extracts) from the machine 11 to remote users. This is achieved by pushing that data into a remote database 16a of the remotely-located data management system 16 that comprises data gathering applications and web display applications that provide web browser access to the data stored in the remote database 16a. Remote users may access the data across the LAN, WAN, or the Internet, or using cellular, or satellite Internet connectivity. Traditionally, the remote database 16a may be located within a user's facility, or may be remotely located with access provided by Internet or WAN connectivity, but in the present invention, access to the remote database 16a is provided by cellular or satellite Internet connectivity. This description focusses on use of a remote database 16a that is part of the remotely-located data management system 16.

Details regarding operational data and extraction of the operational data from the machine 11, and particularly GENSET 11, and communication of this extracted data to the remote database 16a is as follows. Typical engine data that is extracted includes RPM, Oil Pressure, Coolant Temperature, Volts, Amps, and the like. Typically, engine data that has changed since the last inquiry are reported and transmitted to the remote database 16a. The machine 11 is commanded by a user via the remotely-located data management system 16, the cellular/satellite backhaul communications channel (radios 30, 30a), and the remote annunciator 20 to extract the operational data using a desktop or mobile web browser 19. The remote annunciator 20 in conjunction with the remotely-located data management system 16 and remote database 16a provide the user with global remote access to real-time engine data via the web browser 19.

The remotely-located data management system 16 includes data gathering applications that are designed to receive encrypted packets from the remote annunciator 20, and store them in the database 16a. The remote database 16a may be local to the data gathering applications, or at a remote cellular/satellite Internet-connected location. The remotely-located data management system 16 also provides a web service application that allows web access to the data, via a simple web browser program 19 on the user computer 18 or mobile device. The remote database 16a is typically a SQL database that is capable of redundancy and replication, so as to provide a safe method of backup.

In contrast to conventional implementations, the remote annunciator 20 is responsible for making and maintaining the network connection to the remotely-located data management system 16. Because a socket connection is initiated from the user side of any firewall, the connection is typically allowed automatically with no special settings applied to the firewall. Upon connecting to the remotely-located data management system 16, the remote annunciator 20 identifies itself to the data management system 16, and the remotely-located data management system 16 allows the connection and subsequent data transfer. Should the connection be dropped for any reason, the remote annunciator 20 automatically reconnects and reestablishes the data transport connection with the remotely-located data management system 16. This design essentially removes the necessity for on-site network engineering, resulting in savings of time and money during installation.

With specific reference to the improvements provided by the present invention, the primary cellular/satellite backhaul connectivity employed in the remote annunciator 20 operates using conventional wireless transport protocols. This cellular/satellite connectivity bypasses the router 24 entirely, thus removing the requirement for dependence on customer infrastructure. No conventional remote annunciator is implemented in this manner. The secondary Ethernet Internet backhaul connectivity that may optionally be used in the remote annunciator 20 operates in either a server-assigned (DHCP) IP addressing or static IP addressed mode. The DHCP method allows simple plug and play installation, while assignment of a static IP address to the remote annunciator 20 requires a few minutes of setup on site. The primary cellular/satellite backhaul connectivity employed in the remote annunciator 20 eliminates the need for on site setup at a customer's facility.

FIG. 2 illustrates details of the exemplary power generating system 10 and remote annunciator 20 shown in FIG. 1. The remote annunciator 20 is used to interface with one or more power generators with engine controllers, referred to as GENSETs 11 (1–n) or machines 11 (1–n). The remote annunciator 20 may be collocated with the machine 11, but may be remotely located from the machine 11. The power generators and engine controllers, or machines 11, may be located thousands of feet away from the remote annunciator 20.

A basic purpose of the remote annunciator 20 is to alert an operator or remote user of a machine 11 that a problem has occurred with its operation, such as reporting Running, Low Fuel, and Low Oil Pressure Boolean alerts, for example. In accordance with the principles of the present invention, the remote annunciator 20 extracts engine data related to the machine 11, such as RPM, Oil Pressure, Coolant Temperature, Volts, and Amps, and the like, and communicate this data to remote users via a cellular or satellite communication link, preferably comprising the radios 30, 30a. It is believed that this has not been done in prior art remote annunciators. Thus, the remote annunciator 20 communicates relevant engine 11 (or other monitored device) data to a remotely-located data management system 16 and to remote users of such monitored devices and annunciators in a manner not heretofore employed. In particular, the present invention employs cellular or satellite communication protocols to communicate between machines, engines, engine controllers, pumps, compressors, or other monitored device 11 and the remote database 16a of the remotely-located data management system 16.

Figure 4:
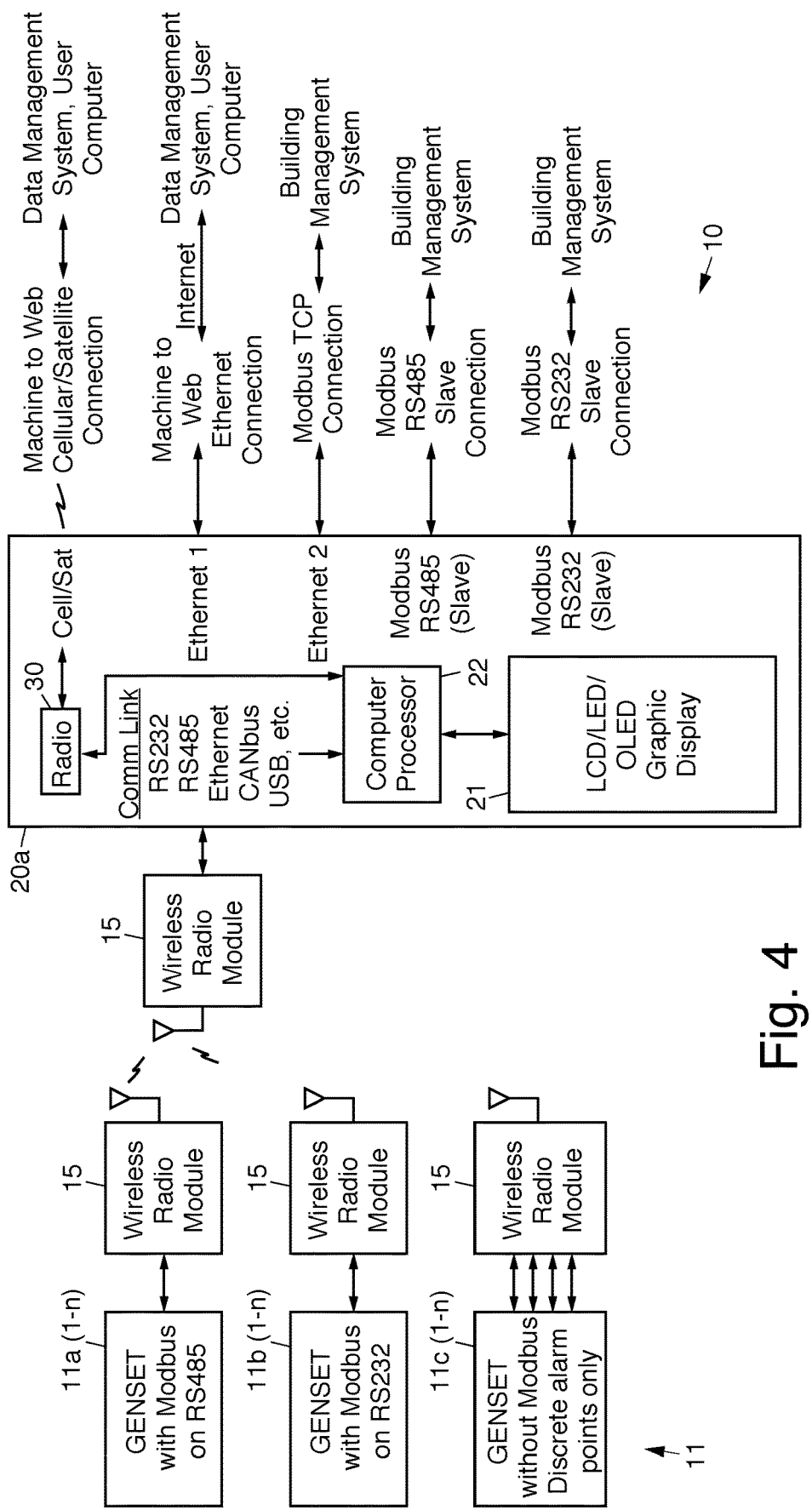
FIG. 4 shows an alternative embodiment of the remote annunciator.

The remote annunciator 20 comprises the cellular/satellite radio 30, and the remotely-located data management system 16 comprises a compatible cellular/satellite radio 30a. An exemplary satellite radio 30, 30a manufactured by Iridium. for example, as well as Broadband Global Area Network (BGAN) or Very Small Aperture Terminal (VSAT) satellite radios. The radio 30 is shown in the drawing figures as being internal to the remote annunciator 20. It is to be understood, however, that the radio 30 may be external to the remote annunciator 20, such as is illustrated in FIG. 4 with reference to wireless radio modules 15, such as spread spectrum radio modules 15. For example, the cellular radio 30 in a reduced to practice embodiment of the remote annunciator 20 is disposed internal to the remote annunciator 20. An Iridium satellite radio 30 may be disposed internal or external to the remote annunciator 20, while higher performance satellite radio devices such as BGAN or VSAT would most likely be disposed external to the remote annunciator 20, because of their relatively large size.

Different types of machines 11 (1–n) are currently deployed. For example, as is shown in FIG. 2, a first type of machine 11a comprises a power generator and controller having an RS485 interface that communicates using a Modbus protocol. A second type of machine 11b comprises a power generator and controller having an RS232 interface 12b that communicates using a Modbus protocol. A third type of machine 11c comprises a power generator and controller without a Modbus interface that communicates over discrete alarm wires, with or without an RS485-to-discrete converter 12c. A fourth type of machine 11d comprises a power generator and controller using CAN bus, LON Works, or other alternative serial data interfaces. All of these machines 11 and their operation are well-known to and well-understood by those skilled in the art. A fifth type of machine 11e comprises a power generator and controller that communicates using a ModbusTCP via Ethernet protocol 12e.

"RS232" refers to a serial data transfer protocol that that is an Electronics Industry Alliance (EIA) standard for connecting serial devices, and is commonly used for simple point-to-point communication. "RS485" refers to a serial data transfer protocol that is an EIA standard for multipoint communications.

The first type of machine 11a may use an engine controller such as a model DEC 550 engine controller manufactured by Kohler, or a model EMCP3 controller manufactured by Caterpillar, for example. The second type of machine 11b may use a model "E" panel or "F" panel engine controller manufactured by Generac, for example. The third type of machine 11c include older machines 11 manufactured by substantially all generator manufacturers.

The second type of machine 11b may be coupled to the cellular/satellite Internet-connected remote annunciator 20 by way of an RS485 to RS232 converter 12, for example, or via the RS232 port of the remote annunciator 20. The third type of machine 11c may be coupled to the cellular/satellite Internet-connected remote annunciator 20 by way of an RS485 to discrete converter 13, for example. Such discrete-input-to-Modbus converters are generally available, such as those referred to as ADAM modules, built by Advantech. Alternative wireless connections between the machines 11 and the remote annunciator 20 may be provided, which will be discussed with reference to FIG. 4.

The various machines 11 are connected to the remote annunciator 20 using the appropriate protocol for the particular machine 11 as illustrated in FIG. 2. The remote annunciator 20 provides interfaces to each machine 11, such as by way of the RS485 or RS232 interface (Modbus master), for example. In the alternative embodiment shown in FIG. 4, the remote annunciator 20 interfaces to the machines 11 by way of an RS232 interface. The remote annunciator 20 polls the engine controller and responds to condition signals transmitted from the engine controllers and lights one or more graphic indicators on a touchscreen graphic display 21 or touchscreen display panel 21, such as a liquid crystal display (LCD) touchscreen graphic display 21, light emitting diode (LED) or organic light emitting diode (OLED) touchscreen graphic display 21, for example, and also typically sounds an alarm horn 34 to alert the user of the alarm condition, as may be required.

The remote annunciator 20 also includes various interfaces that provide for Internet and network connectivity. These interfaces include a machine to web cellular/satellite connection (Cell/Sat), a machine to web Ethernet connection (Ethernet 1), a ModbusTCP connection (Ethernet 2), a Modbus RS485 slave connection (Modbus RS485 slave), and a Modbus RS232 slave connection (Modbus RS232 slave). It is to be understood that there may only be one physical Ethernet port, but multiple connections on that physical port. The machine Ethernet connection, the Ethernet Internet connection, and the BMS connection, may all be implemented using a single physical port, or if desired, may be implemented using separate physical ports. The primary machine to web cellular/satellite connection and secondary machine to web Ethernet connection are used to communicate with the data management system 16. In particular, the machine to web cellular/satellite connection is used as a primary backhaul channel to communicate operational data, conditions, and alarms relating to the machine 11 or other monitored device 11 to the remote database 16a of the remotely-located data management system 16. The ModbusTCP connection is used to communicate with the machine 11 or other monitored device 11. The Modbus RS485 and Modbus RS232 slave connections are used to communicate with the building management system 17.

Referring to FIG. 3, it illustrates details of the exemplary cellular/satellite Internet-connected remote annunciator 20 shown in FIG. 2. The remote annunciator 20 comprises a plurality of interface and display circuits, including microcircuits and/or integrated circuits, that may be disposed on a printed circuit board. It is to be understood that, although most of the integrated circuit components of the cellular/satellite Internet-connected remote annunciator 20 are shown as discrete circuits in FIG. 3, these individual microcircuits may be integrated into a single circuit, such as within a computer processor 22, or microcontroller 22, for example. Thus, it is the functions of the various interfaces that are provided that are important, and not the specific physical form of the implementation that is important.

The remote annunciator 20 comprises a master RS485 interface 23 and a master RS232 interface 24. The RS485 interface 23 may be implemented using an integrated circuit such as model ADM 1487AR RS485 interface, manufactured by Analog Devices, for example. The RS232 interface 24 may be implemented using an integrated circuit such as model ADM 202 RS232 interface, manufactured by Analog Devices, for example. The RS485 interface 23 implements a Modbus master communication protocol over an RS485 link. The RS232 interface 24 implements a Modbus master communication protocol over an RS232 link.

In the exemplary embodiment of the remote annunciator 20 shown in FIG. 3, the input RS485 and RS232 interfaces 23, 24 are coupled to the computer processor 22, or microcontroller 22. An exemplary computer processor 22 is a model 18F452 processor, manufactured by Microchip, for example.

The remote annunciator 20 comprises a cellular/satellite port 25 that couples the computer processor 22 to the cellular/satellite radio 30. The remote annunciator 20 comprises a cellular/satellite backhaul interface. The cellular/satellite backhaul interface provides a communication interface between the cellular/satellite radio 30 in the remote annunciator 20 and the cellular/satellite radio 30a in the remotely-located data management system 16. This allows communication of data to and from the remote database 16a.

The remote annunciator 20 comprises first and second Ethernet interfaces 26a, 26b, or ports 26a, 26b. Exemplary Ethernet interfaces 26a, 26b may be Xport Ethernet interfaces manufactured by Lantronix, for example. The computer processor 22 is coupled to the first and second Ethernet interfaces 26a, 26b, or ports 26a, 26b.

The remote annunciator 20 also comprises an RS485 Modbus slave interface 27 and an RS232 Modbus slave interface 28. The RS485 Modbus slave interface 27 may be a model ADM 1487AR RS485 interface, for example. The RS232 Modbus slave interface 28 may be a model ADM 202 RS232 interface, for example. The computer processor 22 is coupled to the RS485 and RS232 Modbus slave interfaces 27, 28.

The computer processor 22 is coupled to interface electronics 32 that are used to couple status and alarm signals received from the machine 11 by way of the input RS485 and RS232 interfaces 23, 24 to the touchscreen graphic display 21. The interface electronics 32 may be well-known port expanders, such as model PCA 9554A, port expanders manufactured by Philips, for example, or may be driven directly by the processor 22.

The computer processor 22 may communicate with the interface electronics 32 by way of a serial bus, for example, such as an I2C (Inter-IC) multi-master bus designed by Philips Semiconductor, which is used to connect integrated circuits, or by way of a serial peripheral interface (SPI), which is a full-duplex synchronous serial interface for connecting low-medium-bandwidth external devices using four wires, for example.

The interface electronics 32 are coupled to a silence switch 35 that allows a user to turn off the alarm horn 34. It is to be understood that the silence switch 35 may be implemented as a section of the touchscreen graphic display 21. The interface electronics 32 may be also coupled to terminals 31 that connect to the discrete alarm wires that are coupled to the third type of machine 11c (having no Modbus interface). The interface electronics 32 route the alarm signals to the computer processor 22 and/or graphic display 21. The interface electronics 32 are coupled to a system test switch 36 that permits testing of the system and the graphic display 21. It is to be understood that the system test switch 36, may be implemented as a section of, or touchscreen button of, the touchscreen graphic display 21.

The remote annunciator 20 provides a means for displaying alerts to the user as well as a means for monitoring data output by the engine controller of the machine 11 and transmitting (pushing) it to the remote database 16a. This eliminates the need for a separate monitoring device directly coupled to the engine controller. Transmission of the data to the remote database 16a is achieved using the cellular/satellite Internet connection, comprising the wireless cellular or satellite communication links, but the Ethernet interfaces 26a, 26b may be used, if necessary.

The data that is transmitted (pushed) it to the remote database 16a includes engine data, which is processed to make it web-accessible so that technical service personnel can access the data to evaluate the performance of their installed power generators and engine controllers. The remote annunciator 20 in conjunction with the remote database 16a provide global remote access to real-time engine data via a desktop or mobile web browser 19. This interface provides both automatic reporting of engine data or polled access to specific values. Evaluation of the data presented in the database 16a may be used for predictive failure avoidance solutions based on trend analysis of key machine parameters.

FIG. 4 shows a power generating system 10 employing an alternative embodiment of the remote annunciator 20a. In this embodiment, the remote annunciator 20a is coupled to the machines 11 using the RS232 Modbus master interface 24. In this embodiment, each of the machines 11 that communicate with the remote annunciator 20 is coupled to a wireless radio module 15 such as a spread spectrum radio module 15, and the RS232 Modbus master interface 24 is also coupled to a wireless radio module 15 such as a spread spectrum radio module 15. The spread spectrum radio modules 15 may be a model Connexlink, manufactured by Aerocomm, for example. The respective spread spectrum radio modules 15 communicate with each other to transmit signals between the respective machines 11 and the cellular/satellite Internet-connected remote annunciator 20a. As with the cellular/satellite radio 30, the remote annunciator 20 preferably includes a wireless radio module 15 such as a spread spectrum module 15 internal to it for convenience, although the wireless radio module 15 (spread spectrum module 15) is shown external to the remote annunciator 20 in FIG. 4. Either location may be used, depending upon the size of the spread spectrum radio 15, but the functionality is substantially the same in either implementation.

Figure 5:
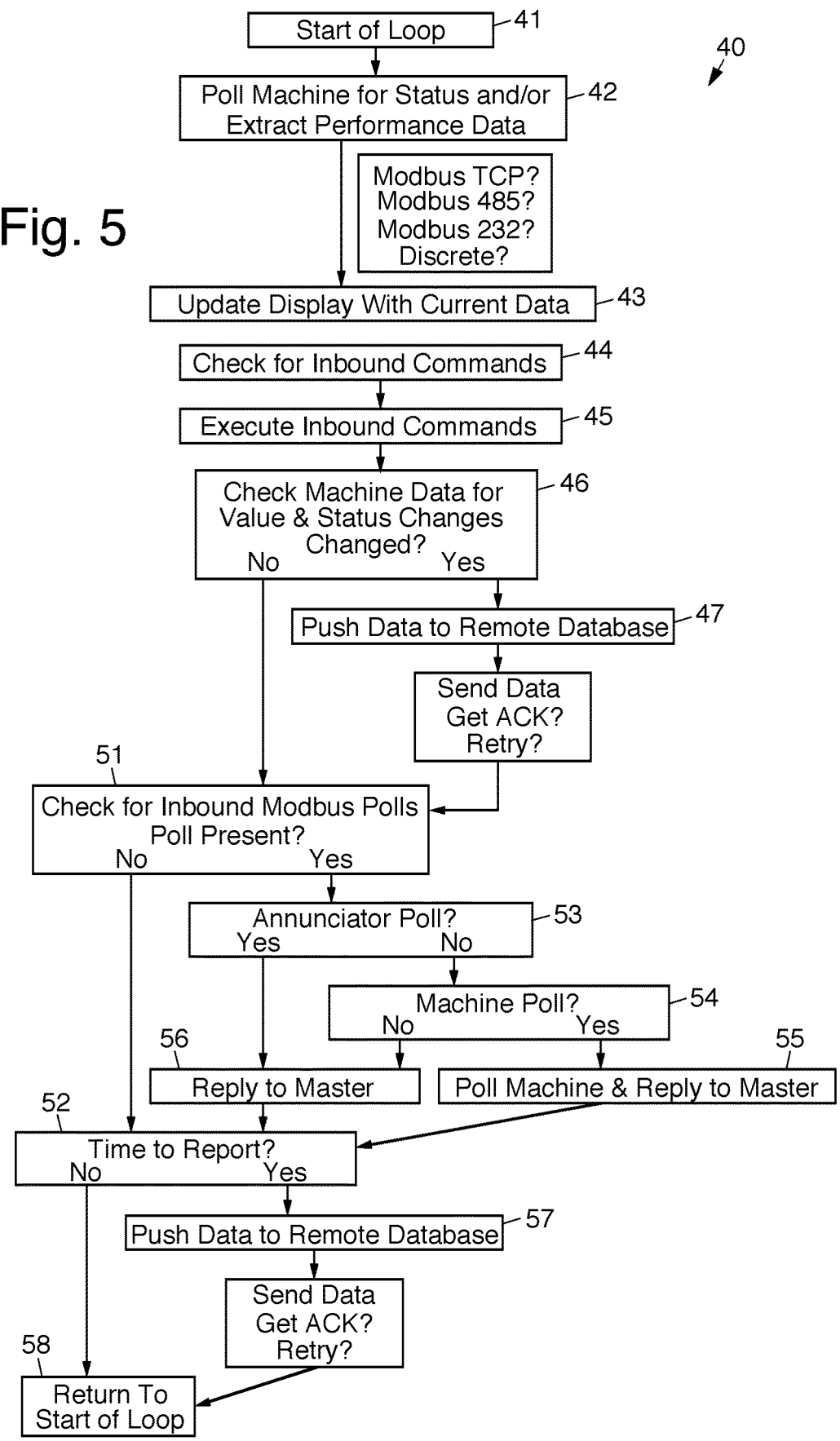
FIG. 5 is a flow diagram that illustrates an exemplary method or algorithm in accordance with the principles of the present invention.

FIG. 5 is a flow diagram that illustrates an exemplary method 40 in accordance with the principles of the present invention. The exemplary method 40 is operative to poll a machine 11, display alarm signals that are generated by the machine 11, and transmit polled data to t remote database 16a where it is made web accessible to technical service personnel. The method 40 may be implemented as an algorithm 40 implemented in the computer processor 22 of the remote annunciator 20.

With regard to the specifics of the method 40 or algorithm 40, at a start of a polling loop 41, the machines 11 coupled to the remote annunciator 20 are polled 42 regarding their status. Based upon settings of the remote annunciator 20, the processor 22 will obtain engine status data via one of the Modbus master interfaces 23, 24, or via the discrete wire interface 29. The graphic display 21 is updated with current data 43 (on or off) in response to the received signals.

The processor 22 checks 44 the cellular/satellite port 25 to determine the presence of any inbound commands from the remote data management system 16 transmitted over the cellular/satellite communication link or connection (i.e., radios 30, 30a). Inbound packets are typically held at the cellular/satellite interface through flow control signals. If inbound packets are present, the processor 22 responds to the commands or data requests contained in the inbound packet, and executes 45 the commands.

The data communicated to the machine 11 in the packet also includes commands relating to operation of the machine 11. The data communicated by the machine 11 is checked 46 to determine whether values or status have changed.

If the values or status have not changed (NO), the processor 22 then moves on to check 51 for inbound Modbus polls, through the Modbus slave ports 26b, 27, 28. If the generator values have changed (YES) in the change test 44 (i.e., the inbound command check 44), then the new condition, and optionally an array of generator information is sent 47 to the remote database 16a. Upon transmitting the packets of data to the remote database 16a, the processor 22 checks for an acknowledgement from the remote database 16a, indicating that the packet was received in good condition. If the acknowledgement is not received, the processor 22 will send the packet again until successful acknowledgement is received.

The processor 22 checks the Modbus slave ports, 26b, 27, 28 for inbound polls 51 from a Modbus master, such as the building management system 17. If a poll is present, the processor decodes the poll to determine if it is for annunciator data 53 or for generator data 54. If the poll is for annunciator data 53, the processor 22 responds with the appropriate data to the master with a Modbus response via the same port on which the poll was received. If the poll is for generator data 54, the processor 22 responds to the master with the appropriate generator data. If the generator interface is via discrete wiring 29, the processor 22 may respond to the poll with status information available within the remote annunciator 20. If the generator is connected to the remote annunciator via one of the Modbus master ports 23, 24, the processor 22 creates a Modbus poll 55 to the machine 11 via the master ports 23, 24, and listens for the response from the machine 11. Upon receipt of the machine data, the processor 22 responds 55 to the original inbound poll via the Modbus slave ports with the requested data.

In real-time remote monitoring applications, data is pushed to the remote database 16a on a regular time-based interval via the cellular/satellite backhaul communication link in order to provide an ever-present remote view into the operation of the remote equipment. This interval might range from a few seconds to hours, depending on the needs of the user. A determination 52 is made if it is time to report to the remote database 16a. If it is not time to report to the remote database 16a, a return 58 to the start of loop 41 is made.

If it is time to report to the remote database 16a, then the array of operational data is transmitted 57 (pushed) to a remote database 16a using the cellular/satellite backhaul communication link. During transmission, a data packet is sent to the remote database 16a which returns an acknowledgement (ACK). If the acknowledgement is received, the process moves on to return 58 to the top of the primary loop 41. If the acknowledgement is not received, the data is resent to the remote database 16a until a acknowledgement (ACK) is received. The method then returns 58 to the start of the loop 41.

The result of testing the machine 11 for conditions and delivering the data to the remote database 16a is that all of the operational data is made available to remote users via a simple web browser interface. This allows equipment owners to confirm the operation of their equipment, service organizations to detect operational alarms and to respond quickly before catastrophic failures occur, and factory engineers to analyze the operational reliability of fielded equipment. The benefit and unique design of the current invention is based on the fact that remote annunciators 20 are commonly required for locations involving health and safety. By combining local display (traditional annunciator function) with remote database and data management connectivity, all of the operational data available from the machine 11 may be archived throughout the life of the machine 11, with no additional cost to the owner. This improves upon conventional techniques in which a separate monitoring system was required in order to achieve the connectivity that is provided by the remote annunciator 20.

Conventional remote annunciators have utilized discrete wire connection and serial data alarm transfer, but these annunciators are for local display only. The present invention is different from the prior art as a result of the cellular/satellite backhaul connection to the external database 16a and web display process, allowing users to access the current and historical operational data from the engine controller. Further, the present invention is capable of displaying its alarm conditions not just to the local indicators, but to an unlimited number of computer screen displays as a result of its network connectivity. While conventional remote annunciators provided blinking LEDs and sonic alarms in a single physical location, mounted to a wall in a hallway, for example, the present invention can display alarms on the touchscreen graphic display 21 of the remote annunciator 20 as well as computer screens of users around the world instantly and simultaneously.

Further, as a result of the cellular/satellite Internet connectivity that is a fundamental aspect of the present invention, remote users may initiate operation of the generators located in distributed geographic locations. This remote control operation is particularly valuable in utility power programs, where distributed generation is called upon to reduce demand on distribution and transmission systems. Example programs are sometimes referred to as "Demand Response" programs. The present invention uniquely enables connectivity of generators to a common, external remote monitoring and control process, or system, comprising the remote database 16a, allowing those generators to become part of a large scale, utility demand driven power production program.

In this aspect of the present invention, a plurality of power generating systems 10 are coupled to the remote monitoring and control system comprising the remote database 16a by way of a plurality of remote annunciators 20. The remote monitoring and control system comprising the remote database 16a monitors the operation of the generators and controls individual generators by way of the remote annunciators 20. The combination of the remote annunciators 20 and the remote monitoring and control system communicating via the cellular/satellite backhaul communication link (radios 30, 30a) allows remote control operation of the generators.

While the present invention has been disclosed with reference to power generators, it also has application for use with fire pumps that use engines coupled to engine controllers. As was mentioned in the Background section, many buildings are required to have pumps to be able to drive adequate flow to upper floors for fire prevention reasons. Many of them use diesel engines, and they, too, can benefit from the present invention.

In accordance with the present invention, the remote annunciator 20 replaces a conventional annunciator and interfaces with the engine controller via the cellular/satellite backhaul communication link in order to monitor and/or control the engine of the fire pump. The drawing figures indicate that either a machine 11 or engine may be coupled to the remote annunciator 20. The balance of the system and processing relating to interfacing the engine controller of the fire pump to the remote annunciator 20 is substantially as described above. The benefits of having a remote annunciator 20 with a touchscreen graphic display 21 and a cellular/satellite backhaul communications link allow its use in mobile firefighting applications.

Thus, remote annunciators and methods and/or algorithms for monitoring equipment, or machines, such as power generating systems, displaying engine alerts and operational data and conditions, and providing cellular/satellite backhaul and command connectivity with a remotely-located data management system and database, have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Remote annunciator apparatus for use with a mechanical or electrical device coupled to controller that is external to the remote annunciator apparatus, comprising:
an enclosure remotely located from the mechanical or electrical device and controller that comprises:
a communication interface for communicating with the controller;
a computer processor coupled to the communication interface, for polling the controller to monitor mechanical or electrical device operational data and conditions reported by the controller;
an LCD, LED, or OLED display coupled to the computer processor and communication interface for displaying visual indicators indicative of mechanical or electrical device operational data and conditions reported by the controller; and
a cellular or satellite radio, or internet connection disposed within or adjacent the enclosure that is coupled to the computer processor for communicating the device operational data and conditions to a database of a remotely-located data management system, and/or for communicating commands from a user computer via the remotely-located data management system to the controller that are executed to remotely poll and control operation of the mechanical or electrical device.

2. The apparatus recited in claim 1 wherein the database comprises a web-accessible database that provides for remote access to real-time device operational data and conditions by way of a web browser.

3. The apparatus recited in claim 1 wherein the annunciator apparatus simultaneously communicates with multiple controllers coupled to respective mechanical or electrical devices.

4. The apparatus recited in claim 1 wherein the computer processor implements an algorithm that automatically reports mechanical or electrical device operational data and provides for polled access to specific operational data.

5. The apparatus recited in claim 1 wherein the computer processor comprises one or more algorithms that cooperate with algorithms in the remotely-located data management system to remotely control the mechanical or electrical device.

6. The apparatus recited in claim 1 wherein the processor implements an algorithm that:
polls the controller for status and presents data on the LCD, LED, or OLED display in response to the status reported by the controller;
polls the controller for mechanical or electrical device operational parameter values; and
transmits the mechanical or electrical device operational parameter values and status to the database at predetermined times or if operational parameter values or status have changed.

7. The apparatus recited in claim 6 wherein the algorithm:
checks for inbound commands input by a remote user using the data management system that are received via the cellular or satellite radio;
if commands are received, transmits the commands by way of the communication interface to the device controller; and
transmits results of the commands received from the controller to the database via the cellular or satellite radio or internet connection.

8. The apparatus recited in claim 1 further comprising a wireless spread spectrum radio communication link coupled between the controller and the computer processor.

9. The apparatus recited in claim 1 wherein the internet connection comprises an Ethernet connection coupled to the computer processor for communicating the mechanical or electrical device operational data and conditions by way of an Ethernet connection of the remotely-located data management system to the database of the remotely-located data management system, and/or for communicating commands by way of an Ethernet connection of the user computer to the controller that are executed to remotely poll and control operation of the mechanical or electrical device.

10. The apparatus recited in claim 1 wherein the controller comprises a ModbusTCP over Ethernet interface.

11. Remote annunciator apparatus for use with a power generator coupled to a controller that is external to the remote annunciator apparatus, comprising: an enclosure remotely located from the power generator and controller that comprises: a communication interface for communicating with the controller; a computer processor coupled to the communication interface, for polling the controller to monitor power generator operational data and conditions reported by the controller; and a graphic display coupled to the computer processor and communication interface for displaying visual indicators indicative of power generator operational data and conditions reported by the controller; and a cellular, satellite radio, or internet connection disposed within or adjacent the enclosure that is coupled to the computer processor for communicating the power generator operational data and conditions to a database of a remotely-located data management system.

12. The apparatus recited in claim 11 wherein the database comprises a web-accessible database that provides for remote access to real-time power generator data by way of a web browser.

13. The apparatus recited in claim 11 wherein the remote annunciator apparatus is configured to communicate commands from a user computer via the remotely-located data management system to the controller that are executed to remotely poll and control operation of the power generator.

14. The apparatus recited in claim 11 wherein the computer processor implements an algorithm that automatically reports power generator operational data and provides for polled access to specific operational data.

15. The apparatus recited in claim 11 wherein the computer processor comprises one or more algorithms that cooperate with algorithms in the remotely-located data management system to remotely control the power generator.

16. The apparatus recited in claim 11 wherein the processor implements an algorithm that:
polls the controller for status and activates the display in response to the status reported by the controller;
polls the controller for power generator operational parameter values; and
transmits the controller values and status to the database via the internet connection at predetermined times or if values or status have changed.

17. The apparatus recited in claim 16 wherein the algorithm:
checks for inbound commands input by a remote user using the data management system that are received via the cellular or satellite radio or internet connection;
if commands are received, transmits the commands by way of the communication interface to the controller; and
transmits results of the commands received from the controller to the database via the internet connection.

18. The apparatus recited in claim 11 further comprising a spread spectrum radio communication link coupled between the controller and the computer processor.

19. The apparatus recited in claim 11 further comprising an Ethernet connection coupled to the computer processor for communicating the power generator operational data and conditions by way of an Ethernet connection of the remotely-located data management system to the database, and/or for communicating commands by way of an Ethernet connection of the user computer to the controller that are executed to remotely poll and control operation of the power generator.

20. The apparatus recited in claim 11 wherein the controller comprises a ModbusTCP over Ethernet interface.

21. A method for use with a remote annunciator and a power generator coupled to a controller that is external to the remote annunciator, comprising: providing a remotely-located data management system comprising a web-accessible database and a cellular or satellite radio or an internet connection; coupling the remote annunciator to the controller, which annunciator comprises an enclosure remotely located from the power generator and controller that comprises a communication interface for communicating with the controller, a computer processor coupled to the communication interface for polling the controller to monitor power generator operational data and conditions reported by the controller, a graphic display coupled to the computer processor and communication interface for displaying visual indicators indicative of power generator operational data and conditions reported by the controller, and a cellular or satellite radio or internet connection disposed within or adjacent the enclosure that is coupled to the computer processor for communicating the power generator operational data and conditions to the web-accessible database by way of the cellular or satellite radio or internet connection of the remotely-located data management system; and polling the controller to monitor power generator operational data and conditions, and communicating the operational data and/or conditions to the web-accessible database by way of the cellular or satellite radio or internet connection.

22. The method recited in claim 21 further comprising communicating with a plurality of controllers via the remotely-located data management system and a respective plurality of remote annunciators using the cellular or satellite radio or internet connection, to permit remote control of a plurality of power generators.

\* \* \* \* \*